(12) United States Patent
Wu (10) Patent No.: US 10,635,213 B2
(45) Date of Patent: Apr. 28, 2020

(54) ON-TOUCH SELF-POWERED E-DISPLAY

(71) Applicant: Toyota Motor Engineering & Manufacturing North America, Inc., Plano, TX (US)

(72) Inventor: Songtao Wu, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 29 days.

(21) Appl. No.: 15/977,620

(22) Filed: May 11, 2018

(65) Prior Publication Data

US 2019/0346952 A1 Nov. 14, 2019

(51) Int. Cl.
*G06F 3/041* (2006.01)
*G06F 3/045* (2006.01)

(52) U.S. Cl.
CPC ............ *G06F 3/0412* (2013.01); *G06F 3/045* (2013.01); *G09G 2300/0426* (2013.01)

(58) Field of Classification Search
CPC .................. G06F 3/0412; G06F 3/045; G09G 2300/0426
See application file for complete search history.

(56) References Cited

U.S. PATENT DOCUMENTS

| | | |
|---|---|---|
| 6,738,050 B2 | 5/2004 | Comiskey et al. |
| 7,868,778 B2 | 1/2011 | Kenwright |
| 8,416,197 B2 | 4/2013 | Feng et al. |
| 8,519,677 B2 | 8/2013 | Post et al. |
| 9,178,446 B2 | 11/2015 | Wang et al. |
| 9,489,856 B2 | 11/2016 | Herz et al. |

(Continued)

FOREIGN PATENT DOCUMENTS

| | | |
|---|---|---|
| JP | 2013182853 | 3/2012 |
| WO | WO 2017/031048 | 2/2017 |

OTHER PUBLICATIONS

Karagozler et al.; "Paper Generators: Harvesting Energy from Touching, Rubbing and Sliding" 8 pages; Mar. 13, 2010.

(Continued)

*Primary Examiner* — Aneeta Yodichkas
(74) *Attorney, Agent, or Firm* — Snell & Wilmer LLP (57) ABSTRACT

An on-touch e-paper display includes an e-ink substrate having a plurality of cells each having a fluid, positively charged particles of a first color, and negatively charged particles of a second color. The on-touch e-paper display further includes a transparent triboelectric generator. The transparent triboelectric generator includes a main portion including a transparent conductor located on the e-ink substrate, and a transparent electron negative dielectric material located on the transparent conductor such that the transparent conductor is located between the e-ink substrate and the transparent electron negative dielectric material at the main portion. The transparent triboelectric generator further includes a hand electrode including the transparent electron negative dielectric material located on the e-ink substrate, and the transparent conductor located on the transparent electron negative dielectric material such that the transparent electron negative dielectric material is located between the e-ink substrate and the transparent conductor at the hand electrode.

17 Claims, 9 Drawing Sheets

(56) References Cited

U.S. PATENT DOCUMENTS

| | | |
|---|---|---|
| 9,753,538 B2 | 9/2017 | Hong et al. |
| 9,786,410 B2 | 10/2017 | Shimizu et al. |
| 9,830,006 B2 | 11/2017 | Song et al. |
| 2012/0280919 A1 | 11/2012 | Chu |
| 2012/0320001 A1* | 12/2012 | Gila .................. G02F 1/167 345/204 |
| 2015/0097465 A1 | 4/2015 | Karagozler et al. |
| 2016/0195994 A1* | 7/2016 | Kitada .................. G06F 3/044 345/174 |
| 2016/0363998 A1* | 12/2016 | Colgate ................. G06F 3/016 |

OTHER PUBLICATIONS

Zhong et al.; "Self-Powered Human-Interactive Transparent Nanopaper Systems" ASNANO, vol. 9, No. 7, pp. 7399-7406, 2015.
Ito et al.; "Front Drive Display Structure for Color Electronic Paper Using Fully Transparent Amorphous Oxide TFT Array" IEICE Trans. Electron.; vol. E90-C, No. 11, pp. 2105-2111, Nov. 2007.

\* cited by examiner

| MATERIAL | CHARGE |
|---|---|
| POLYURETHANE FOAM | +60 |
| SORBOTHANE | +58 |
| HAIR, OILY SKIN | +45 |
| SOLID POLYURETHANE, FILLED | +40 |
| MAGNESIUM FLUORIDE (MgF2) | +35 |
| NYLON, DRY SKIN | +30 |
| GLASS (SODA) | +25 |
| PAPER (UNCOATED COPY) | +10 |
| COTTON | +5 |
| NITRILE RUBBER | +3 |
| WOOL | 0 |
| POLYCARBONATE | -5 |
| STYRENE-BUTADIENE RUBBER (SBR, BUNA S) | -35 |
| PET (MYLAR) SOLID | -40 |
| POLYSTYRENE | -70 |
| POLYIMIDE | -70 |
| VINYL: FLEXIBLE (CLEAR TUBING) | -75 |
| CARTON-SEALING TAPE (BOPP), SANDED DOWN | -85 |
| OLEFINS (ALKENES): LDPE, HDPE, PP | -90 |
| CELLULOSE NITRATE | -93 |
| OFFICE TAPE BACKING (VINYL COPOLYMER) | -95 |
| UHMWPE | -95 |
| NEOPRENE (POLYCHLOROPRENE, NOT SBR) | -98 |
| PVC (RIGID VINYL) | -100 |
| LATEX (NATURAL) RUBBER | -105 |
| VITON, FILLED | -117 |
| EPICHLOROHYDRIN RUBBER, FILLED | -118 |
| SANTOPRENE RUBBER | -120 |
| HYPALON RUBBER, FILLED | -130 |
| BUTYL RUBBER, FILLED | -135 |
| EDPM RUBBER, FILLED | -140 |
| TEFLON | -190 |

ON-TOUCH SELF-POWERED E-DISPLAY

BACKGROUND

1. Field

The present disclosure relates to on-touch e-paper displays powered by transparent triboelectric generators and methods of making the same.

2. Description of the Related Art

As society moves away from the use of fossil fuels, research is being developed into renewable energy sources such as solar power, wind power, and the like. One such renewable energy source that is gaining in popularity is triboelectric energy generation. Triboelectric energy is generated by electrons transferring from one material to another material when friction occurs. Static electricity is a form of triboelectric energy.

Energy that is generated by triboelectric generators tends to have a relatively high voltage and a relatively low average power. This energy profile makes triboelectric generators well suited for some uses and not as well suited for other uses. Accordingly, it is desirable to identify more suitable applications and uses for triboelectric generators.

SUMMARY

Described herein is an on-touch e-paper display. The on-touch e-paper display includes an e-ink substrate having a plurality of cells each having a fluid, positively charged particles of a first color, and negatively charged particles of a second color. The on-touch e-paper display further includes a transparent triboelectric generator. The transparent triboelectric generator includes a main portion including a transparent conductor located on the e-ink substrate, and a transparent electron negative dielectric material located on the transparent conductor such that the transparent conductor is located between the e-ink substrate and the transparent electron negative dielectric material at the main portion. The transparent triboelectric generator further includes a hand electrode including the transparent electron negative dielectric material located on the e-ink substrate, and the transparent conductor located on the transparent electron negative dielectric material such that the transparent electron negative dielectric material is located between the e-ink substrate and the transparent conductor at the hand electrode.

Also disclosed is an on-touch e-paper display. The on-touch e-paper display includes an e-ink substrate. The e-ink substrate includes a plurality of cells each having a fluid, positively charged particles of a first color, and negatively charged particles of a second color. The e-ink substrate further includes a first conductive layer, and a second conductive layer such that the plurality of cells are located between the first conductive layer and the second conductive layer. The on-touch e-paper display further includes a transparent triboelectric generator. The transparent triboelectric generator further includes a main portion including a transparent conductor electrically coupled to the first conductive layer and located on the e-ink substrate, and a transparent electron negative dielectric material located on the transparent conductor such that the transparent conductor is located between the e-ink substrate and the transparent electron negative dielectric material at the main portion. The transparent triboelectric generator further includes a hand electrode including the transparent electron negative dielectric material located on the e-ink substrate, and the transparent conductor electrically coupled to the second conductive layer and located on the transparent electron negative dielectric material such that the transparent electron negative dielectric material is located between the e-ink substrate and the transparent conductor at the hand electrode.

Also disclosed is a method for manufacturing an on-touch e-paper display. The method includes obtaining an e-ink substrate having a plurality of cells each having a fluid, positively charged particles of a first color, and negatively charged particles of a second color, a first conductive layer, and a second conductive layer such that the plurality of cells are located between the first conductive layer and the second conductive layer. The method also includes applying a first layer of a transparent electron negative dielectric material over a first portion of the first conductive layer. The method also includes applying a first layer of a transparent conductor over a second portion of the first conductive layer. The method also includes applying a second layer of the transparent electron negative dielectric material over the first layer of the transparent conductor to form a main portion of a transparent triboelectric generator. The method also includes applying a second layer of the transparent conductor over the first layer of the transparent electron negative dielectric material to form a hand electrode of the transparent triboelectric generator.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes on-touch e-paper displays and methods of making on-touch e-paper displays. The displays are capable of being turned on and off via contact with human skin and are powered by transparent triboelectric generators. Because the triboelectric generator is transparent, it can be advantageously located directly above an e-ink substrate. This provides the benefit of reducing a total size of the on-touch e-paper display. A hand electrode is incorporated into the triboelectric generator, further reducing the total size of the on-touch e-paper display. Use of transparent materials in the triboelectric generator provides the additional advantage of allowing the information displayed on the e-ink substrate to be easily read, as well as protecting the e-ink substrate from damage.

An exemplary on-touch e-paper display includes an e-ink substrate that includes multiple cells each having a fluid, positively charged particles having a first color, and negatively charged particles having a second color. The display further includes a transparent triboelectric generator located on the e-ink display and having a main portion that includes an electron negative dielectric material above a conductor. The transparent triboelectric generator further includes a hand electrode that includes the conductor above the electron negative dielectric material. The display further includes a rectifier located between the triboelectric generator and the e-ink substrate that rectifies an analog voltage output by the triboelectric generator. The display further includes a switch located between the rectifier and the e-ink substrate that allows the polarity of the voltage output by the rectifier to be reversed, thus allowing the display to be turned on and off.

Figure 1:
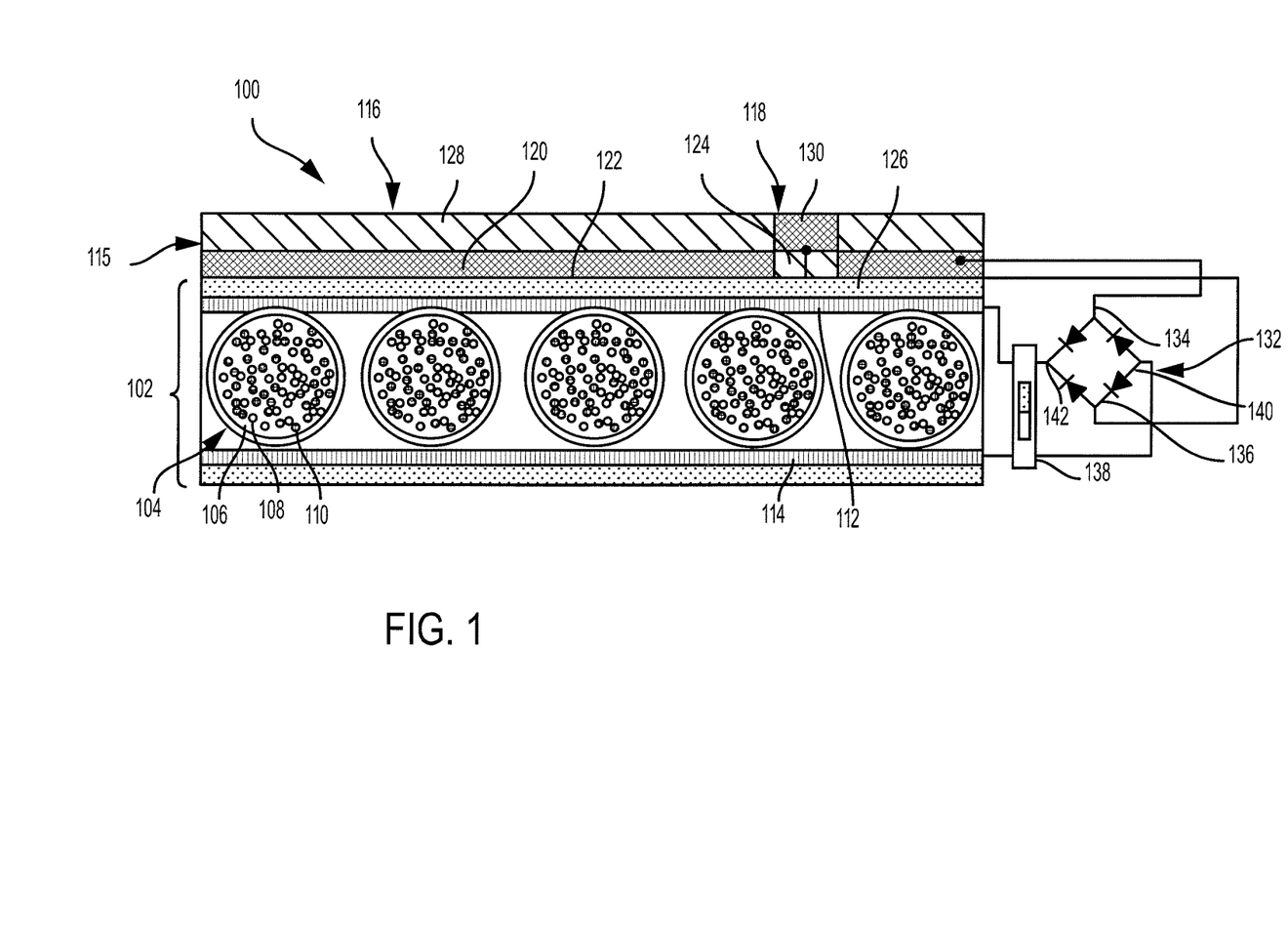
FIG. 1 is a schematic drawing illustrating an on-touch e-paper display that is powered by a transparent triboelectric generator according to an embodiment of the present invention.

Turning to FIG. 1, an on-touch e-paper display 100 is shown. The on-touch e-paper display 100 includes an e-ink substrate 102. The e-ink substrate 102 includes a plurality of cells 104. Each of the plurality of cells 104 includes a fluid 106, positively charged particles 108 of a first color (such as white), and negatively charged particles 110 of a second color (such as black). The e-ink substrate 102 further includes a first, or a top, conductive layer 112 and a second, or a bottom, conductive layer 114. One or both of the first conductive layer 112 and/or the second conductive layer 114 may include a transparent conductor. The positively charged particles 108 of the first color may include, for example, titanium dioxide ($TiO_2$) which is white. The negatively charged particles 110 of the second color may include, for example, carbon which is black.

When a positive electrical charge is applied to the first conductive layer 112 and a negative electrical charge is applied to the second conductive layer 114, the positively charged particles 108 are attracted to the second conductive layer 114 and the negatively charged particles 110 are attracted to the first conductive layer 112. Thus, a user viewing the e-ink substrate 102 from the first conductive layer 112 will see a shape defined by the positively charged particles 108.

The fluid 106 may have the same density as the particles 108, 110. In that regard, when the charge is removed from the first conductive layer 112 and the second conductive layer 114, the particles 108, 110 may remain in their previous configuration (continuing the above example, the positively charged particles 108 remain near the second conductive layer 114 and the negatively charged particles 110 remain near the first conductive layer 112). Thus, a user viewing the e-ink substrate 102 from the first conductive layer 112 will continue to see the shape defined by the positively charged particles 108.

When the polarity of the charge applied to the first conductive layer 112 and the second conductive layer 114 is switched (i.e., when a negative electric charge is applied to the first conductive layer 112 and a positive electric charge is applied to the second conductive layer 114), the positively charged particles 108 are attracted to the first conductive layer 112 and the negatively charged particles 110 are attracted to the second conductive layer 114. Thus, a user viewing the e-ink substrate 102 from the first conductive layer 112 will see a shape defined by the negatively charged particles 110. When the electric charge is removed, the particles 108, 110 remain in their respective positions due to the density of the fluid 106 and the particles 108, 110 being the same or similar.

The on-touch e-paper display 100 further includes a transparent triboelectric generator 115. The transparent triboelectric generator 115 is located directly above the e-ink substrate 102. Stated differently, the transparent triboelectric generator 115 is positioned on the first conductive layer 112 of the e-ink substrate 102. The transparent triboelectric generator 115 is designed to generate a voltage in response to contact with an electron positive dielectric material, such as a human hand.

The transparent triboelectric generator 115 includes a main portion 116 and a hand electrode 118. In some embodiments, the main portion 116 may have a greater surface area or volume than the hand electrode 118. In some embodiments, a ratio of surface area of the main portion 116 to the hand electrode 118 may be between 2 to 1 (2:1) and 100:1, between 2:1 and 50:1, or between 5:1 and 25:1.

The main portion 116 may include a first layer of a transparent conductor 120. The first layer of the transparent conductor 120 may include any conductor that is transparent, and may be located on and in contact with a first portion 122 of the first conductive layer 112 of the e-ink substrate 102. The first layer of the transparent conductor 120 may be deposited or otherwise placed on the first portion 122 using any known technique.

The main portion 116 may further include a second layer of an electron negative dielectric material 128 located on and in contact with the first layer of the transparent conductor 120. The second layer of the electron negative dielectric material 128 may include any transparent electron negative dielectric material. The second layer of the electron negative dielectric material 128 may be deposited or otherwise placed on the first layer of the transparent conductor 120 using any known technique.

The hand electrode 118 may include a first layer of transparent electron negative dielectric material 124 located on and in contact with a second portion 126 of the first conductive layer 112 of the e-ink substrate 102. The transparent electron negative dielectric material 124 of the hand electrode 118 may be the same electron negative dielectric material 128 of the main portion 116 or may include a different electron negative dielectric material. The first layer of the transparent electron negative dielectric material 124 may include any transparent electron negative dielectric material. The first layer of the transparent electron negative dielectric material 124 may be deposited or otherwise placed on the second portion 126 of the first conductive layer 112 using any known technique.

The hand electrode 118 may further include a second layer of a transparent conductor 130 located on and in contact with the first layer of the transparent electron negative dielectric material 124. The second layer of the transparent conductor 130 may include the same conductive material as the first layer of the transparent conductor 120 or any other transparent conductor. The second layer of the transparent conductor 130 may be deposited or otherwise placed on the first layer of the transparent electron negative dielectric material 124 using any known technique.

Because the transparent triboelectric generator 115 includes one or more transparent conductor and one or more transparent electron negative dielectric material, the transparent triboelectric generator 115 is transparent. Where used herein, transparent may include a fully transparent material, a partially transparent material (e.g., 40-60 percent) or may include a translucent material. Thus, the transparent triboelectric generator 115 may be located on a viewing surface of the e-ink substrate 102 and may fail to interfere with viewing of the viewing surface of the e-ink substrate 102, or may minimally interfere with viewing of the viewing surface of the e-ink substrate 102.

The on-touch e-paper display 100 may further include a rectifier 132. The rectifier 132 may be electrically coupled between the transparent triboelectric generator 115 and the e-ink substrate 102. In particular, the rectifier 132 may include a first terminal 134, a second terminal 136, a third terminal 140, and a fourth terminal 142. The first terminal 134 may be electrically coupled to the first layer of the transparent conductor 120 of the main portion 116, and the second terminal 136 may be electrically coupled to the second layer of the transparent conductor 130 of the hand electrode 118. The third terminal 140 may be electrically coupled to the first conductive layer 112 of the e-ink substrate 102, and the fourth terminal 142 may be electrically coupled to the second conductive layer 114 of the e-ink substrate 102.

The rectifier 132 may include a plurality of diodes. In some embodiments, the rectifier 132 may include any additional or alternative components that convert an alternating current (AC) signal into a direct current (DC) signal. For example, the rectifier 132 may allow current to flow therethrough in one direction only. In that regard, the rectifier 132 may receive an AC signal from the transparent triboelectric generator 115 and may output a DC signal.

The on-touch e-paper display 100 may further include a switch 138. The switch 138 may be electrically coupled between the rectifier 132 and the e-ink substrate 102. For example, the switch 138 may be electrically coupled between the third terminal 140 of the rectifier 132 and the second conductive layer 114 of the e-ink substrate 102, and between the fourth terminal 142 of the rectifier 132 and the first conductive layer 112 of the e-ink substrate 102.

The switch 138 may have a first position (as shown in FIG. 1) which allows the voltage at the fourth terminal 142 of the rectifier 132 to be applied to the first conductive layer 112 of the e-ink substrate 102, and allows the voltage at the third terminal 140 of the rectifier 132 to be applied to the second conductive layer 114 of the e-ink substrate 102. The switch 138 may have a second position that reverses the polarity of the voltage output by the rectifier 132. Stated differently, when the switch 138 is in the second position, the voltage at the fourth terminal 142 of the rectifier 132 may be applied to the second conductive layer 114 of the e-ink substrate 102, and the voltage at the third terminal 140 of the rectifier 132 may be applied to the first conductive layer 112 of the e-ink substrate 102. Thus, the switch 138 may reverse the polarity of the voltage that is generated by the transparent triboelectric generator 115.

Figure 2A:
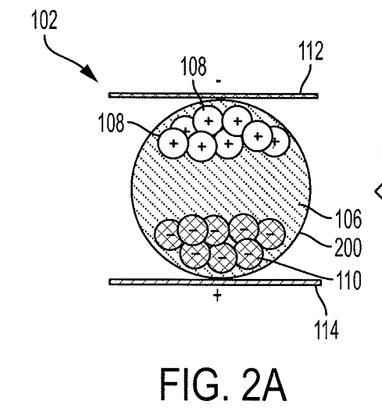
FIGS. 2A and 2B illustrate exemplary operations of a cell of an e-ink substrate of the on-touch e-paper display of FIG. 1 according to an embodiment of the present invention.
Figure 2B:
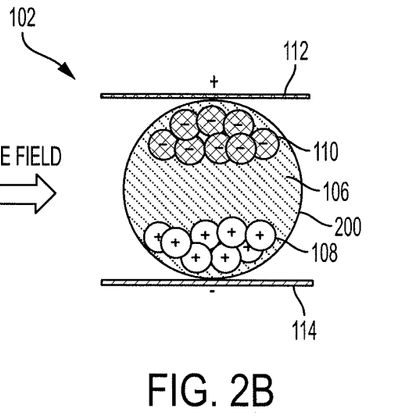

Referring now to FIGS. 2A and 2B, additional details of the e-ink substrate 102 are shown. In particular, FIGS. 2A and 2B illustrate movement of the particles in a cell 200 of the e-ink substrate 102.

In FIG. 2A, a negative electrical charge is applied to the first conductive layer 112 of the e-ink substrate 102, and a positive electrical charge is applied to the second conductive layer 114 of the e-ink substrate 102. As shown, the negative charge attracts the positively charged particles 108 of the first color to the first conductive layer 112, and the positive charge attracts the negatively charged particles 110 of the second color to the second conductive layer 114. Thus, a user viewing the e-ink substrate 102 from the side of the first conductive layer 112 will see the color associated with the positively charged particles 108 of the first color.

In FIG. 2B, the polarity of the electrical charge is switched. In particular, a positive electrical charge is applied to the first conductive layer 112, and a negative electrical charge is applied to the second conductive layer 114. As shown, the positive charge attracts the negatively charged particles 110 of the second color to the first conductive layer 112, and the negative charge attracts the positively charged particles 108 of the first color to the second conductive layer 114. Thus, a user viewing the cell 200 from the side of the first conductive layer 112 will see the color associated with the negatively charged particles 110 of the second color.

Figure 3:
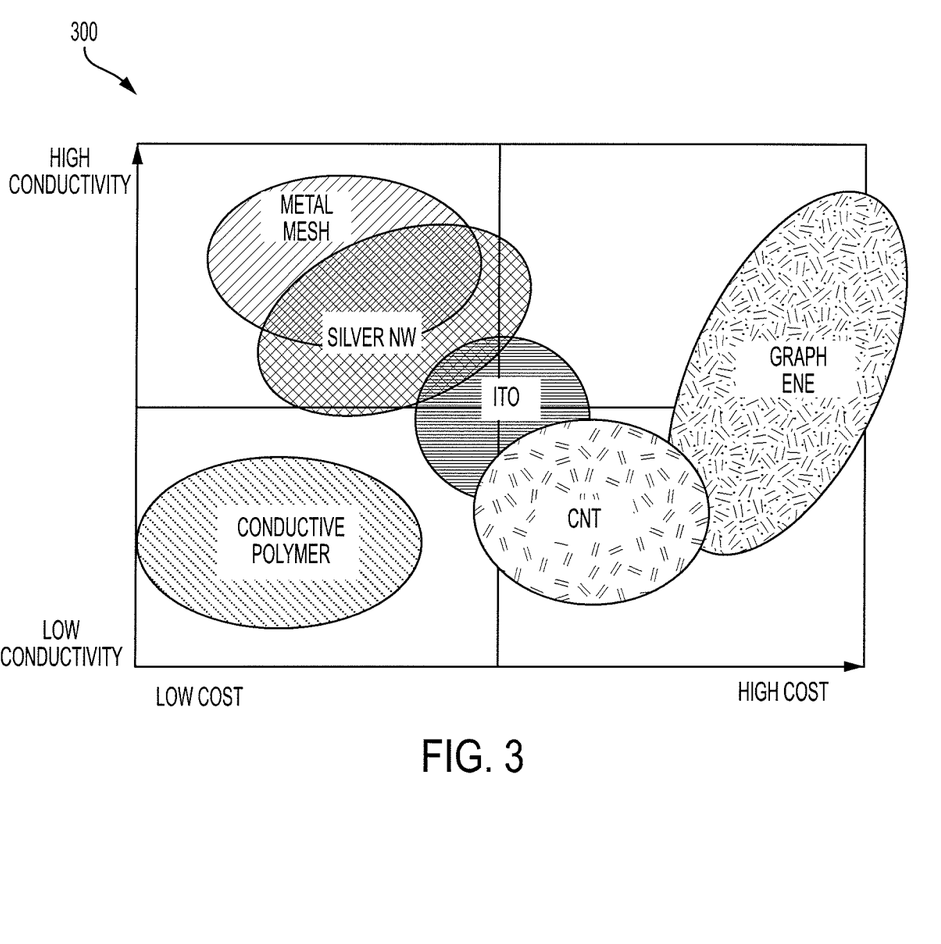
FIG. 3 is a graph that plots monetary cost and conductivity of various transparent conductors according to an embodiment of the present invention.

Referring now to FIGS. 1 and 3, a graph 300 illustrates the cost and conductivity of various transparent conductors. Any of the transparent conductors illustrated in the graph 300 may be used as the first layer of the transparent conductor 120 or as the second layer of the transparent conductor 130. The transparent conductors include an indium tin oxide (ITO), a silver, a carbon nanotube (CNT), a graphene, a metal mesh, or a conductive polymer. In some embodiments, ITO may provide a desirable balance between conductivity and cost, and may be used as the first layer of the transparent conductor 120 and as the second layer of the transparent conductor 130.

Figure 4:
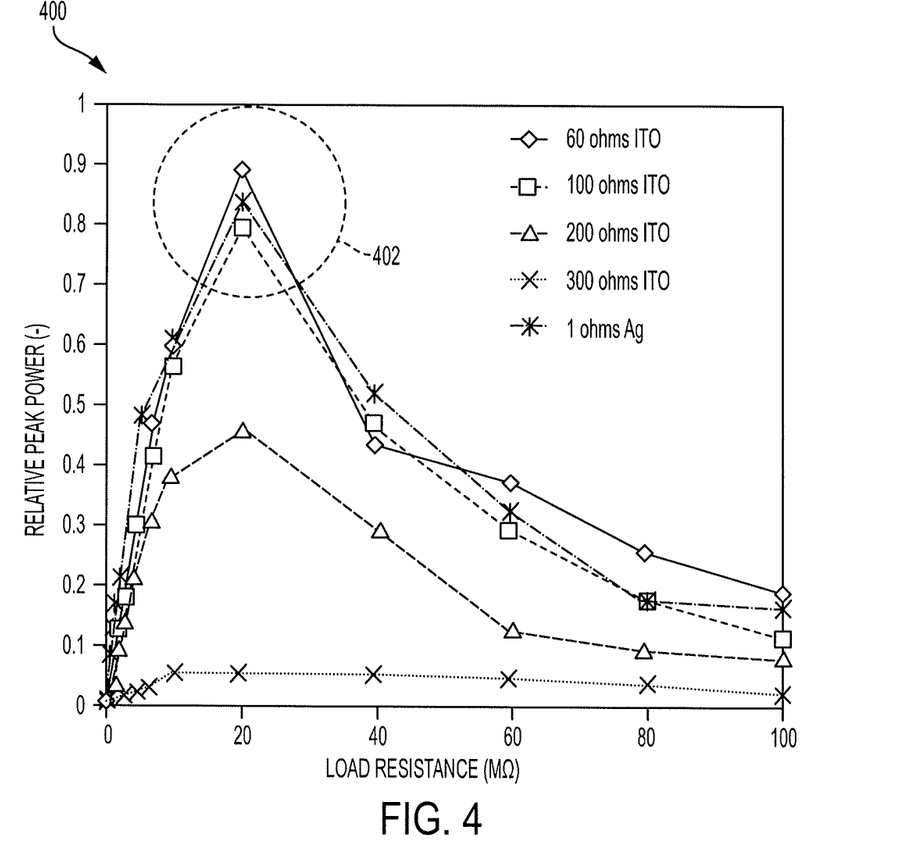
FIG. 4 is a graph that plots load resistance and peak power of various transparent conductors according to an embodiment of the present invention.

Referring now to FIG. 4, a graph 400 plots load resistance against relative peak power for various transparent conductors. Transparent conductors that achieve a relative peak power in an area 402 of the graph 400 may be desirable. It may be desirable for the transparent conductor to have a resistivity that is less than or equal to 100 ohms per square. In some embodiments, it may be desirable for the transparent conductor to have a conductivity that is greater than or equal to 200 Siemens per meter.

Figure 5:
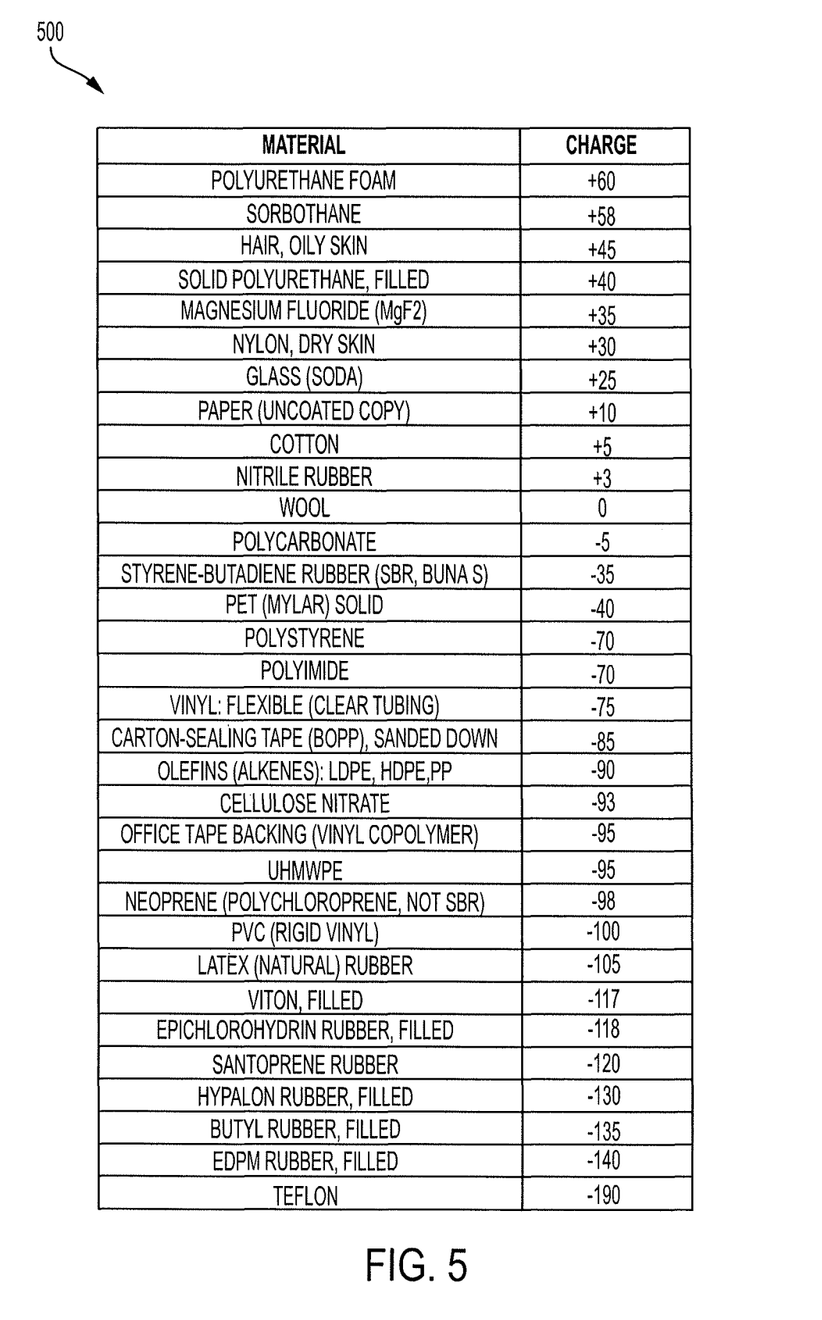
FIG. 5 is a chart illustrating various transparent dielectric materials and their tendency to gain or lose electrons according to an embodiment of the present invention.

Referring now to FIG. 5, a chart 500 illustrates various transparent dielectric materials and their tendency to gain or lose electrons in response to friction with another material. Electron negative dielectric materials have a tendency to gain electrons in response to friction with other materials (and are designated with a negative charge value), and electron positive dielectric materials have a tendency to lose electrons in response to friction with other materials (and are designated with a positive charge value).

The on-touch e-paper display 100 of FIG. 1 is designed to be powered by touch with human skin (which is an electron positive dielectric material). Thus and referring to FIGS. 1 and 5, any of the electron negative dielectric materials shown in the chart 500 may be used as one or both of the first layer of the electron negative dielectric material 124 of the hand electrode 118 or the second layer of the electron negative dielectric material 128 of the main portion 116.

In that regard, the first layer of the electron negative dielectric material 124 of the hand electrode 118 and the second layer of the electron negative dielectric material 128 of the main portion 116 may each include one or more of a polycarbonate (PC), a styrene-butadiene rubber (SBR), a polyethylene terephthalate (PET), a polystyrene, a polyimide, a vinyl, a carbon-sealing tape, an olefin (alkene), a cellulose nitrate, an office tape backing, an ultra-high-molecular-weight polyethylene (UHMWP), a neoprene, a polyvinyl chloride (PVC), a latex rubber, a viton, an epichlorohydrin rubber, a santoprene rubber, a hypalon rubber, a butyl rubber, an ethylene propylene diene monomer (EPDM) rubber, or a polytetrafluoroethylene (PTFE).

Figure 6:
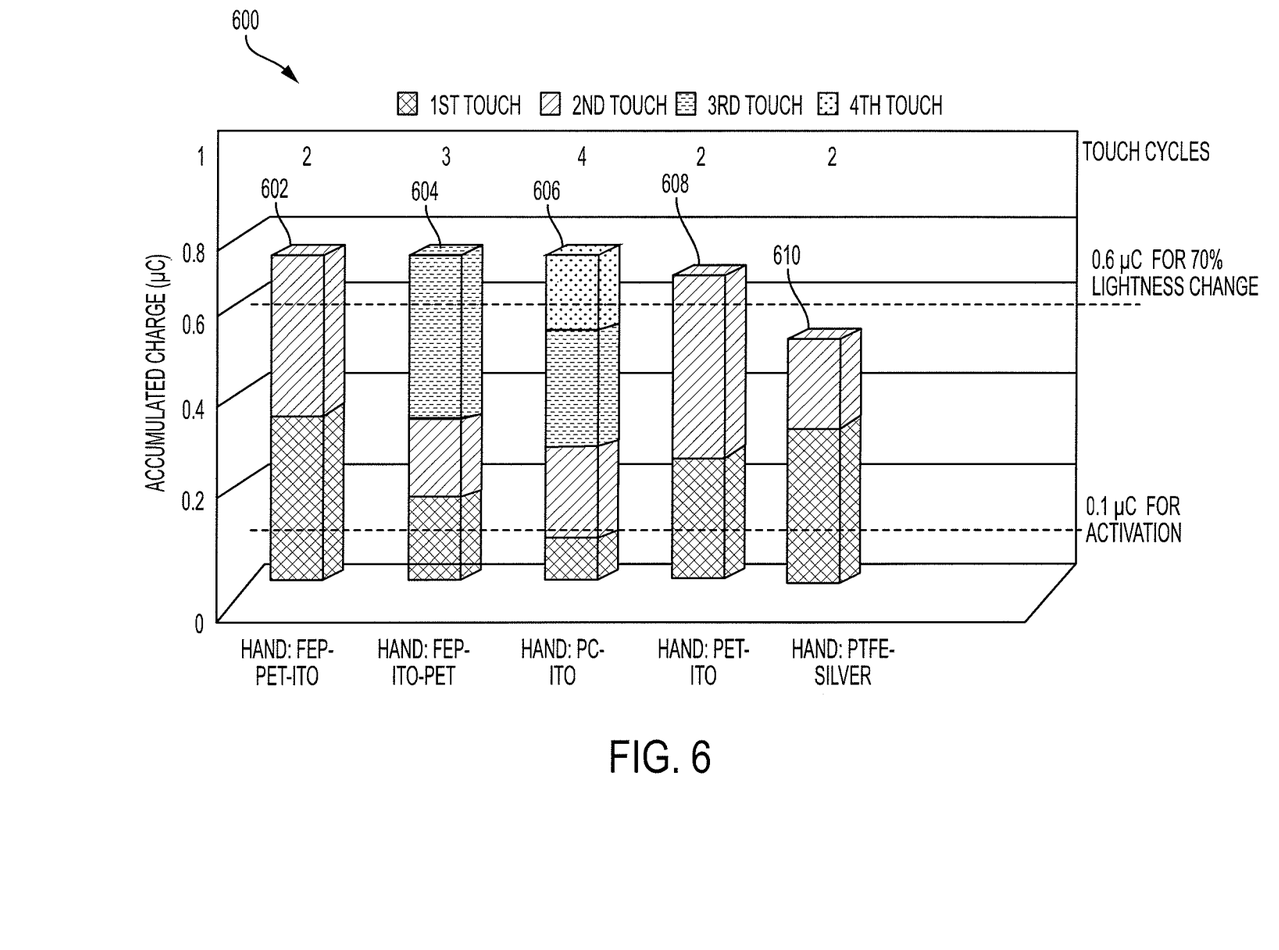
FIG. 6 is a chart illustrating accumulated charge of on-touch e-paper displays that utilize various transparent conductors and transparent electron negative dielectric materials according to an embodiment of the present invention.

Turning now to FIGS. 1 and 6, a graph 600 illustrates experimental results using various materials as the first layer of the electron negative dielectric material 124 of the hand electrode 118, the first layer of the transparent conductor 120 of the main portion 116, the second layer of the electron negative dielectric material 128 of the main portion 116, and the second layer of the transparent conductor 130 of the hand electrode 118. The graph 600 illustrates accumulated charge experienced at the first conductive layer 112 of the e-ink substrate 102 after multiple touches by a human hand. As shown, a 70 percent (70%) change in lightness of the on-touch e-paper display 100 requires an accumulated charge of 0.6 microcoulombs (µC). In the experiments, the positively charged particles 108 of the first color were white, and the negatively charged particles 110 of the second color were black.

In the experiments, the first layer of the transparent conductor 120 and the second layer of the transparent conductor 130 used the same transparent conductor, and the first layer of the electron negative dielectric material 124 and the second layer of the electron negative dielectric material 128 used the same electron negative dielectric material 124. Furthermore, each touch shown on the graph 600 corresponds to a hand simultaneously touching the second layer of the electron negative dielectric material 128 of the main portion 116 and the second layer of the transparent conductor 130 of the hand electrode 118.

A first bar 602 illustrates an experiment in which the transparent conductor included ITO and the electron negative dielectric material included a layer of FEP placed on top of a layer of PET. As shown, approximately 0.35 µC was achieved after a first touch and approximately 0.8 µC was achieved after a second touch. Thus, this combination of materials provides satisfactory results because a greater than 70% lightness change is achievable after only two touches.

A second bar 604 illustrates an experiment in which the main portion 116 included PET located between the first layer of the transparent conductor 120 (which again was ITO) and the first portion 122 of the first conductive layer 112, and included FEP as the second layer of the electron negative dielectric material 128. As shown, this combination provided an accumulated charge of approximately 0.6 µC after three touches, and is thus less desirable than the combination of materials used in the experiment illustrated by the first bar 602.

A third bar 606 illustrates an experiment in which the transparent conductor included ITO and the electron negative dielectric material included PC. As shown, four touches were required to achieve an accumulated charge greater than 0.6 µC.

A fourth bar 608 illustrates an experiment in which the transparent conductor included ITO and the electron negative dielectric material included PET. As shown, an accumulated charge of approximately 0.65 µC was achieved after only two touches, which is greater than the 0.6 µC charge required for 70% lightness change.

A fifth bar 610 illustrates an experiment in which the transparent conductor included silver and the electron negative dielectric material included PTFE. As shown, an accumulated charge of approximately 0.65 µC was achieved after only two touches, which is greater than the 0.6 µC charge required for 70% lightness change.

Referring to FIGS. 1 and 7A through 7F, an exemplary use of the on-touch e-paper display 100 is shown. The exemplary use shown in FIGS. 7A through 7F includes ITO as the first layer of the transparent conductor 120 and the second layer of the transparent conductor 130, and includes PET as the first layer of the electron negative dielectric material 124 and the second layer of the electron negative dielectric material 128.

Figure 7A:
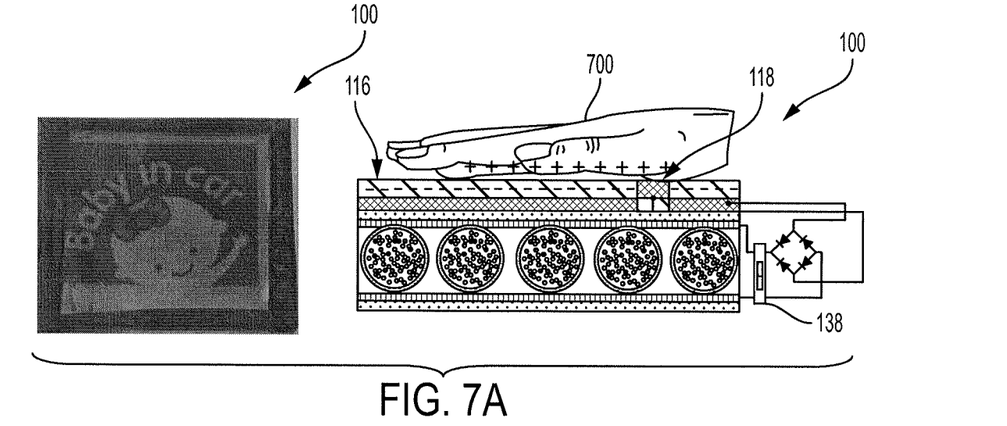
FIGS. 7A to 7F illustrate exemplary operation of the on-touch e-paper display of FIG. 1 according to an embodiment of the present invention.
Figure 7B:
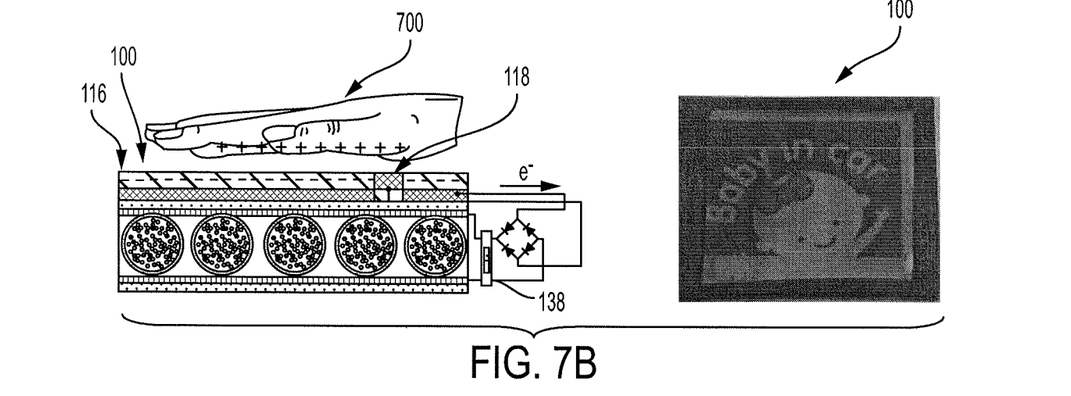
Figure 7C:
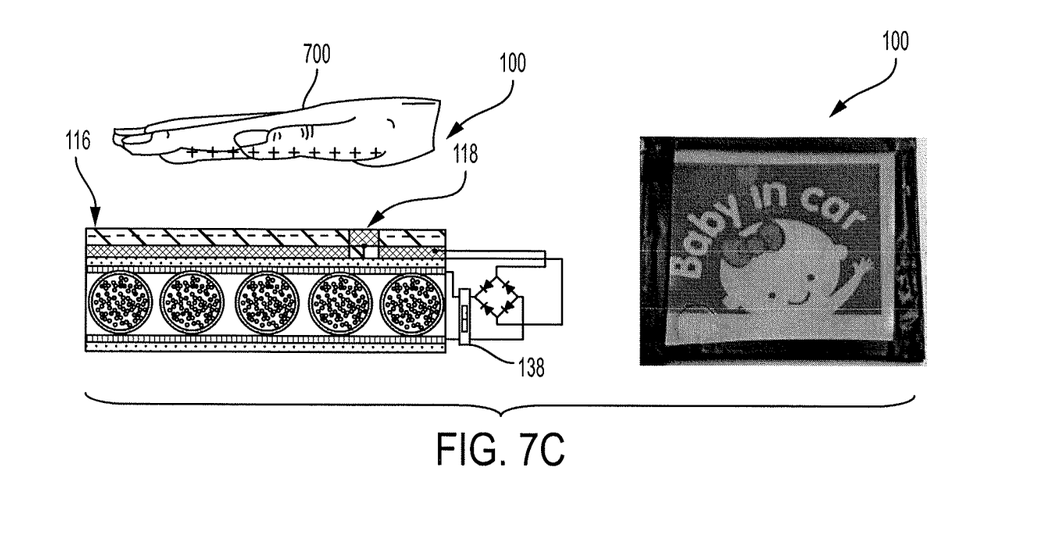

In FIGS. 7A through 7E, the switch 138 is in the first position. FIG. 7A illustrates the on-touch e-paper display during a first touch of the main portion 116 and the hand electrode 118 by a human hand 700. FIG. 7B illustrates the on-touch e-paper display 100 after the hand 700 was removed from the main portion 116 and the hand electrode 118 after the first touch. FIG. 7C illustrates the on-touch e-paper display 100 with the hand 700 moving back towards the main portion 116 and the hand electrode 118 prior to a second touch. As shown, the on-touch e-paper display 100 fails to change in lightness without contact, but does change in lightness both in response to contact with the hand 700 and in response to the hand 700 being removed from the on-touch e-paper display 100.

Figure 7D:
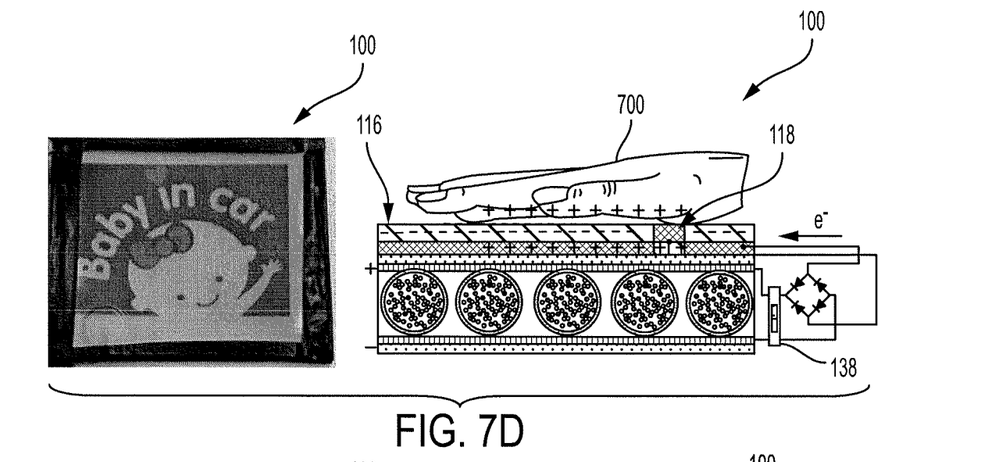
Figure 7E:
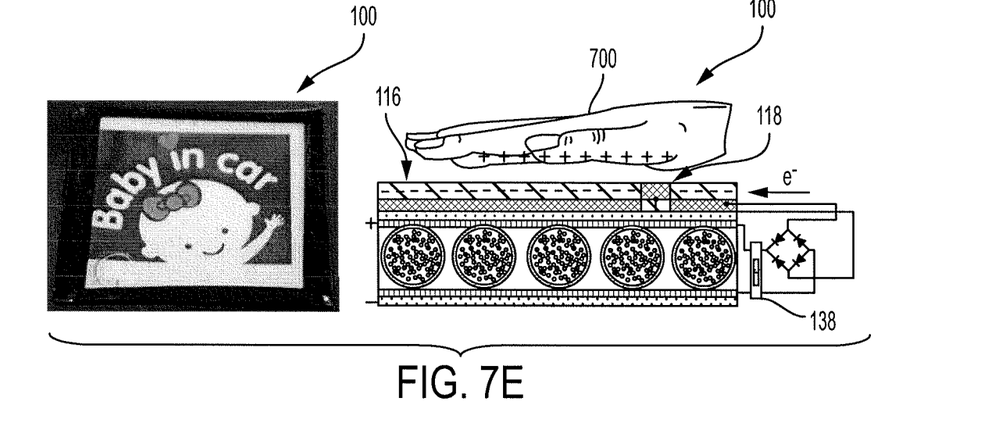

FIG. 7D illustrates the on-touch e-paper display 100 during a second touch of the main portion 116 and the hand electrode 118 by the human hand 700. As shown, the on-touch e-paper display 100 is brighter during the second touch than prior to the second touch. FIG. 7E illustrates the on-touch e-paper display 100 after the hand 700 was removed from the main portion 116 and the hand electrode 118 after the second touch. As shown, removal of the hand 700 provides additional charge, thus causing the on-touch e-paper display 100 to further increase in lightness.

Figure 7F:
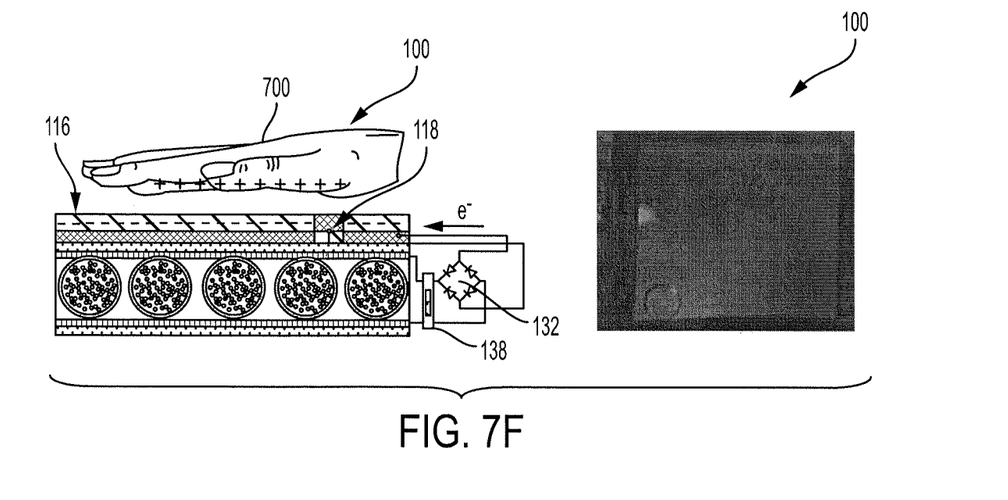

After the hand 700 was removed after the second touch (i.e., after the result in FIG. 7E), the switch 138 was switched to the second position to switch the polarity of the output of the rectifier 132. FIG. 7F illustrates the on-touch e-paper display after multiple touches of the main portion 116 and the hand electrode 118 by the human hand 700 with the switch 138 in the second position.

Figure 8:
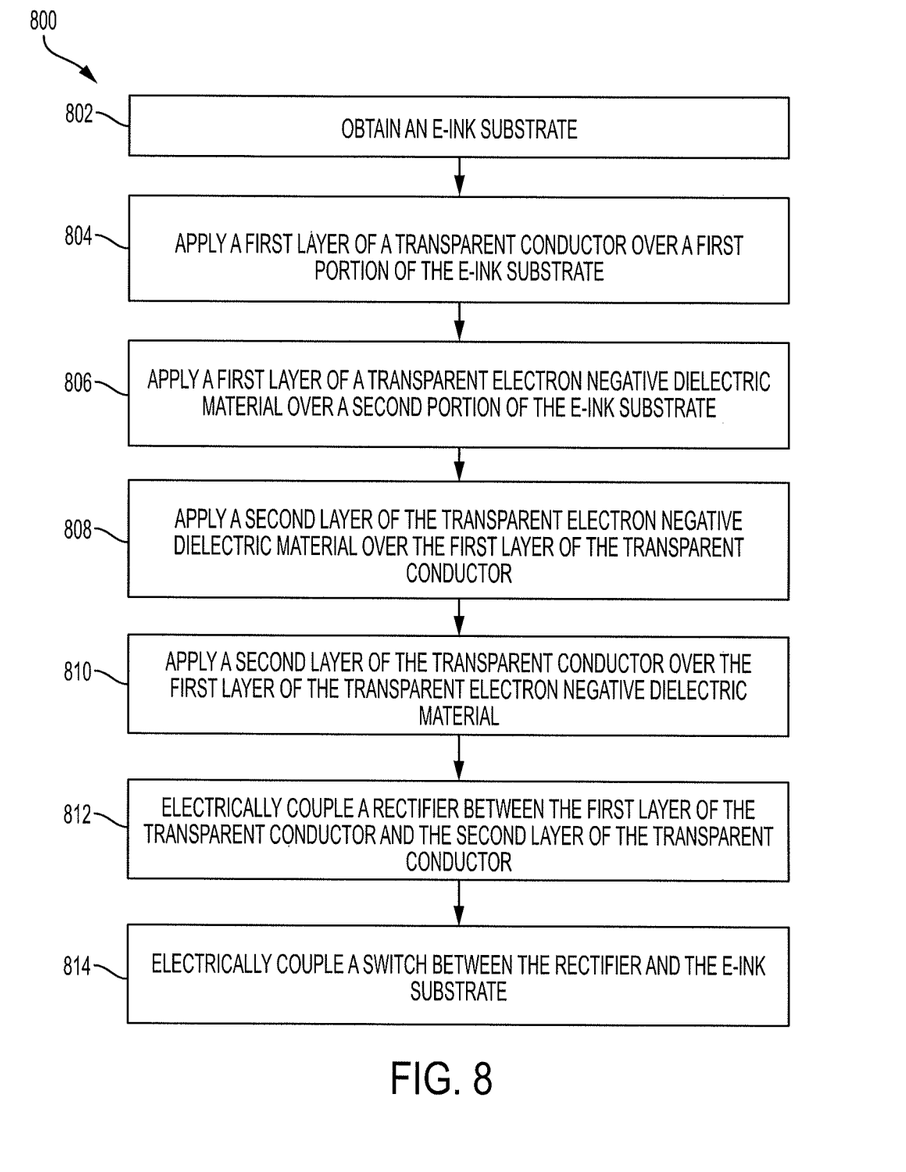
FIG. 8 is a flowchart illustrating a method for forming an on-touch e-paper display according to an embodiment of the present invention.

Referring now to FIG. 8, a flowchart 800 illustrates a method for making an on-touch e-paper display, such as the on-touch e-paper display 100 of FIG. 1. In block 802, an e-ink substrate may be obtained. The e-ink substrate may include a plurality of cells that each include a fluid, positively charged particles of a first color, and negatively charged particles of a second color. The e-ink substrate may further include a first, or a top, conductive layer and a second, or a bottom, conductive layer such that the plurality of cells are located between the first conductive layer and the second conductive layer.

In block 804, a first layer of a transparent conductor may be applied to a first portion of the e-ink substrate. For example, the first layer of the transparent conductor may be applied to a majority of the top conductive layer of the e-ink substrate. The first layer of the transparent conductor may be applied using any known technique such as spraying, brushing, chemical vapor deposition, or the like.

In block 806, a first layer of a transparent electron negative dielectric material may be applied to a second portion of the e-ink substrate. For example, the first layer of the transparent electron negative dielectric material may be applied to the remainder of the top conductive layer of the e-ink substrate that does not include the first layer of the transparent conductor. The first layer of the transparent electron negative dielectric material may be applied to the e-ink substrate using any known technique such as spraying, brushing, chemical vapor deposition, or the like.

In some embodiments, it may be desirable to use a relatively low temperature and low vacuum method of applying the first layer of the transparent conductor and the first layer of the transparent electron negative dielectric material to the e-ink substrate due to relatively poor durability of the e-ink substrate. Therefore, techniques such as spraying or brushing may be preferable.

In block 808, a second layer of the transparent electron negative dielectric material may be applied over the first layer of the transparent conductor. The combination of the first layer of the transparent conductor and the second layer of the transparent electron negative dielectric material may be referred to as a main portion of a transparent triboelectric generator. The second layer of the transparent electron negative dielectric material may be applied using any known technique such as spraying, brushing, chemical vapor deposition, or the like.

In block 810, a second layer of the transparent conductor may be applied to the first layer of the transparent electron negative dielectric material. The combination of the first layer of the transparent electron negative dielectric material and the second layer of the transparent conductor may be referred to as a hand electrode of the transparent triboelectric generator. The second layer of the transparent conductor may be applied using any known technique such as spraying, brushing, chemical vapor deposition, or the like.

The location of the hand electrode may be selected to be at such a location that is likely to be contacted by a human hand. For example, the hand electrode may be located at a central location of the on-touch e-paper display, or may be located at any other location on the on-touch e-paper display that is likely to be contacted.

In block 812, a rectifier may be electrically coupled between the transparent triboelectric generator and the e-ink substrate. For example, the rectifier may be electrically coupled between the first layer of, the transparent conductor and the second layer of the transparent conductor.

In block 814, a switch may be electrically coupled between the rectifier and the e-ink substrate. The switch may have a first position in which the output of the rectifier is applied directly to the e-ink substrate, and a second position which reverses the polarity of the output of the rectifier prior to the voltage reaching the e-ink substrate.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An on-touch e-paper display comprising:
   an e-ink substrate having:
   a top conductive layer,
   a plurality of cells each having a fluid, positively charged particles of a first color, and negatively charged particles of a second color, and
   a bottom conductive layer located on an opposite side of the plurality of cells from the top conductive layer; and
   a transparent triboelectric generator positioned such that the top conductive layer of the e-ink substrate is located between the transparent triboelectric generator and the plurality of cells, the transparent triboelectric generator having:
   a main portion including a first transparent conductor located on the e-ink substrate and electrically coupled to the top conductive layer or the bottom conductive layer of the e-ink substrate, and a first transparent electron negative dielectric material located on the first transparent conductor such that the first transparent conductor is located between the e-ink substrate and the first transparent electron negative dielectric material at the main portion, and
   a hand electrode including a second transparent electron negative dielectric material located on the e-ink substrate, and a second transparent conductor electrically coupled to the other of the top conductive layer or the bottom conductive layer of the e-ink substrate and located on the second transparent electron negative dielectric material such that the second transparent electron negative dielectric material is located between the e-ink substrate and second the transparent conductor at the hand electrode.

2. The on-touch e-paper display of claim 1 further comprising a rectifier electrically coupled between the first transparent conductor of the main portion of the transparent triboelectric generator and the second transparent conductor of the hand electrode of the transparent triboelectric generator.

3. The on-touch e-paper display of claim 1 further comprising a switch electrically coupled between the transparent triboelectric generator and the e-ink substrate and configured to reverse a polarity of the transparent triboelectric generator.

4. The on-touch e-paper display of claim 1 wherein at least one of the first transparent conductor or the second transparent conductor includes at least one of an indium tin oxide (ITO), a silver, a carbon nanotube (CNT), a graphene, a metal mesh, or a conductive polymer.

5. The on-touch e-paper display of claim 1 wherein at least one of the first transparent conductor or the second transparent conductor has at least one of a conductivity that is greater than or equal to 200 siemens per meter or a resistivity that is less than or equal to 100 ohms per square.

6. The on-touch e-paper display of claim 1 wherein at least one of the first transparent electron negative dielectric material or the second transparent electron negative dielectric material includes at least one of a polycarbonate (PC), a styrene-butadiene rubber (SBR), a polyethylene terephthalate (PET), a polystyrene, a polyimide, a vinyl, a carbon-sealing tape, an olefin (alkene), a cellulose nitrate, an office tape backing, an ultra-high-molecular-weight polyethylene (UHMWP), a neoprene, a polyvinyl chloride (PVC), a latex rubber, a viton, an epichlorohydrin rubber, a santoprene rubber, a hypalon rubber, a butyl rubber, an ethylene propylene diene monomer (EPDM) rubber, or a polytetrafluoroethylene (PTFE).

7. The on-touch e-paper display of claim 1 wherein the transparent triboelectric generator generates a voltage in response to a human hand making contact with the first transparent electron negative dielectric material of the main portion and the second transparent conductor of the hand electrode.

8. An on-touch e-paper display comprising:
an e-ink substrate having a plurality of cells each having a fluid, positively charged particles, and negatively charged particles;
a transparent triboelectric generator having:
a main portion including a first transparent conductor located on the e-ink substrate, and a first transparent electron negative dielectric material located on the first transparent conductor such that the first transparent conductor is located between the e-ink substrate and the first transparent electron negative dielectric material at the main portion, and
a hand electrode including a second transparent electron negative dielectric material located on the e-ink substrate, and a second transparent conductor located on the second transparent electron negative dielectric material such that the second transparent electron negative dielectric material is located between the e-ink substrate and the second transparent conductor at the hand electrode; and
a rectifier electrically coupled between the first transparent conductor of the main portion of the transparent triboelectric generator and the second transparent conductor of the hand electrode of the transparent triboelectric generator.

9. The on-touch e-paper display of claim 8 wherein the e-ink substrate further includes a top conductive layer located between the transparent triboelectric generator and the plurality of cells and electrically coupled to the first transparent conductor of the main portion or the second transparent conductor of the hand electrode, and a bottom conductive layer located on an opposite side of the plurality of cells from the top conductive layer and electrically coupled to the other of the first transparent conductor of the main portion or the second transparent conductor of the hand electrode.

10. The on-touch e-paper display of claim 8 further comprising a switch electrically coupled between the transparent triboelectric generator and the e-ink substrate and configured to reverse a polarity of the transparent triboelectric generator.

11. The on-touch e-paper display of claim 8 wherein at least one of the first transparent conductor or the second transparent conductor includes at least one of an indium tin oxide (ITO), a silver, a carbon nanotube (CNT), a graphene, a metal mesh, or a conductive polymer.

12. The on-touch e-paper display of claim 8 wherein at least one of the first transparent conductor or the second transparent conductor has at least one of a conductivity that is greater than or equal to 200 siemens per meter or a resistivity that is less than or equal to 100 ohms per square.

13. The on-touch e-paper display of claim 8 wherein at least one of the first transparent electron negative dielectric material or the second transparent electron negative dielectric material includes at least one of a polycarbonate (PC), a styrene-butadiene rubber (SBR), a polyethylene terephthalate (PET), a polystyrene, a polyimide, a vinyl, a carbon-sealing tape, an olefin (alkene), a cellulose nitrate, an office tape backing, an ultra-high-molecular-weight polyethylene (UHMWP), a neoprene, a polyvinyl chloride (PVC), a latex rubber, a viton, an epichlorohydrin rubber, a santoprene rubber, a hypalon rubber, a butyl rubber, an ethylene propylene diene monomer (EPDM) rubber, or a polytetrafluoroethylene (PTFE).

14. The on-touch e-paper display of claim 8 wherein the transparent triboelectric generator generates a voltage in response to a human hand making contact with the first transparent electron negative dielectric material of the main portion and the second transparent conductor of the hand electrode.

15. An on-touch e-paper display comprising:
an e-ink substrate having a plurality of cells each having a fluid, positively charged particles of a first color, and negatively charged particles of a second color;
a transparent triboelectric generator having:
a main portion including a first transparent conductor located on the e-ink substrate, and a first transparent electron negative dielectric material located on the first transparent conductor such that the first transparent conductor is located between the e-ink substrate and the first transparent electron negative dielectric material at the main portion, and
a hand electrode including a second transparent electron negative dielectric material located on the e-ink substrate, and a second transparent conductor located on the second transparent electron negative dielectric material such that the second transparent electron negative dielectric material is located between the e-ink substrate and the second transparent conductor at the hand electrode, such that the transparent triboelectric generator generates a voltage in response to a human hand making contact with the first transparent electron negative dielectric material of the main portion and the second transparent conductor of the hand electrode; and
a switch electrically coupled between the transparent triboelectric generator and the e-ink substrate and configured to reverse a polarity of the transparent triboelectric generator.

16. The on-touch e-paper display of claim 15 wherein the e-ink substrate further includes a top conductive layer located between the transparent triboelectric generator and the plurality of cells and electrically coupled to the first transparent conductor of the main portion or the second transparent conductor of the hand electrode, and a bottom conductive layer located on an opposite side of the plurality of cells from the top conductive layer and electrically coupled to the other of the first transparent conductor of the main portion or the second transparent conductor of the hand electrode.

17. The on-touch e-paper display of claim 15 further comprising a rectifier electrically coupled between the first transparent conductor of the main portion of the transparent triboelectric generator and the second transparent conductor of the hand electrode of the transparent triboelectric generator.

\* \* \* \* \*